Patented Dec. 17, 1929

1,739,744

UNITED STATES PATENT OFFICE

JOSEPH M. VERDEROSA, OF PARLIN, NEW JERSEY, ASSIGNOR TO E. I. DU PONT DE NEMOURS & COMPANY, OF WILMINGTON, DELAWARE, A CORPORATION OF DELAWARE

PAINT AND VARNISH REMOVER

No Drawing.　　Application filed July 9, 1928.　Serial No. 291,490.

This invention relates to varnish removers and more particularly to a composition for the removal of paint, varnish, and the like from wood and metal surfaces.

The best varnish removers heretofore known and in use comprise a mixture of acetone and benzol containing a small amount of paraffin wax. When this material is applied to a surface the paraffin separates as a separate phase which remains as a blanket and prevents the evaporation of the volatile benzol and acetone. However, since the paraffin wax is not volatile, it remains on the surface in small amounts after the paint or varnish has been removed.

This invention has as an object the providing of an improved composition for the removal of paint, varnish, and the like from wood or metal surfaces. A further object is the providing of such a compound which will not leave a coating on the surface after the paint or varnish has been removed. Further objects will appear hereinafter.

These objects are accomplished by the use of ethylene glycol in place of paraffin wax.

I have found that a composition containing ethylene glycol, acetone and benzol will satisfactorily remove paint, varnish, and the like from wood or metal surfaces and will leave no coating on the surface after the paint or varnish is removed. Although ethylene glycol is insoluble in benzol, in the presence of sufficient acetone a homogeneous solution can be produced. When the composition is applied to a paint or varnish surface, a portion of the acetone evaporates and the ethylene glycol separates as another phase and blankets the volatile solvents so that their evaporation rate is much retarded. The following example is a preferred composition made in accordance with my invention:—

| | |
|---|---|
| Acetone | 50 |
| Benzol | 33⅓ |
| Ethylene glycol | 16⅔ |
| | 100 |

In place of benzol, I may substitute any aromatic solvent, as for example, toluene.

The paraffin wax in the ordinary type of varnish removers, as stated above, is not volatile and remains on the surface in small amounts after the paint or varnish has been removed. This paraffin wax is incompatible with pyroxylin lacquers and must be completely removed before such a finishing material can be applied. Thorough washing with gasoline or other organic liquid will satisfactorily remove the paraffin from a metal surface but it is impossible to remove it from wood with sufficient thoroughness to permit the application of a pyroxylin lacquer. My composition contains no substance which is non-volatile at ordinary room temperatures and, therefore, after its use on either wood or metal surfaces, a pyroxylin lacquer can be applied without encountering the difficulties which occur where compositions containing paraffin are used.

As many apparently widely different embodiments of this invention may be made without departing from the spirit and scope thereof, it is to be understood that I do not limit myself to the specific embodiments thereof except as defined in the appended claims.

I claim:

1. A varnish and paint remover containing ethylene glycol, an aromatic solvent and acetone.

2. A varnish and paint remover containing acetone, benzol and ethylene glycol.

3. A varnish and paint remover containing approximately 50% acetone, 33⅓% benzol and 16⅔% ethylene glycol.

In testimony whereof, I affix my signature.

JOSEPH M. VERDEROSA.